United States Patent
Zhu et al.

(10) Patent No.: US 10,579,039 B2
(45) Date of Patent: Mar. 3, 2020

(54) SETTING UP PHYSICAL TOOLS FOR SCRAP TRIMMING OPERATIONS IN SHEET METAL FORMING BASED ON NUMERICAL SIMULATION RESULTS

(71) Applicant: Livermore Software Technology Corporation, Livermore, CA (US)

(72) Inventors: Xinhai Zhu, Pleasanton, CA (US); Li Zhang, Rochester Hills, MI (US)

( * ) Notice: Subject to any disclaimer, the term of this patent is extended or adjusted under 35 U.S.C. 154(b) by 308 days.

(21) Appl. No.: 15/806,647

(22) Filed: Nov. 8, 2017

(65) Prior Publication Data
US 2018/0067468 A1 Mar. 8, 2018

Related U.S. Application Data

(63) Continuation-in-part of application No. 14/597,937, filed on Jan. 15, 2015, now abandoned.

(51) Int. Cl.
*G06F 17/50* (2006.01)
*G05B 19/402* (2006.01)

(52) U.S. Cl.
CPC ....... *G05B 19/402* (2013.01); *G06F 17/5018* (2013.01); *G05B 2219/35005* (2013.01); *G06F 2217/16* (2013.01); *G06F 2217/42* (2013.01)

(58) Field of Classification Search
CPC ............. G06F 17/5018; G06F 2217/42; G06F 2217/16; G06F 17/5009; G06F 17/5095;
(Continued)

(56) References Cited

U.S. PATENT DOCUMENTS

| | | | |
|---|---|---|---|
| 7,167,816 B1 * | 1/2007 | Olovsson | G06T 17/20 700/98 |
| 2008/0209974 A1 * | 9/2008 | Ewolski | B21D 35/00 72/350 |

(Continued)

OTHER PUBLICATIONS

Dolbow "an extended finite element method for modeling crack growth with frictional contact", Comput. Methods Appl. Mech. Engrg., 190 (2001), pp. 6825-6846. (Year: 2001).*

(Continued)

*Primary Examiner* — Omar F Fernandez Rivas
*Assistant Examiner* — Joshua E. Jensen

(57) ABSTRACT

Physical tools for trimming operations in forming of a sheet-metal part are set up based on numerically-simulated structural behaviors. FEA model representing a stamped sheet metal before trimming and a trimming operation setup are received. Each trim-steel contains a set of cutting-edge nodes associated with trim vector. At least one trim line is established by projecting cutting-edge nodes onto the FEA model according to the trim vector. Numerically-constrained node-pairs along the trim line are created at intersections with edges of crossed finite elements. FEA model is modified by splitting the crossed finite elements to preserve original geometry and to ensure numerical stability. New finite elements are defined using one of the nodes in corresponding node-pairs such that no finite element straddles the trim line. At each solution cycle of a time-marching simulation of trimming operations, simulated structural behaviors are obtained as the scrap portion(s) deforms and falls accordingly.

20 Claims, 13 Drawing Sheets

(58) Field of Classification Search
CPC .. G06F 2217/41; G06F 17/10; G06F 2217/12; G06F 2217/80; G06F 17/5031; G06F 17/5086; G05B 19/404; G05B 2219/45137; G05B 19/402; G05B 2219/35005
See application file for complete search history.

(56) References Cited

U.S. PATENT DOCUMENTS

2009/0299702 A1* 12/2009 Grimes .............. G06F 17/5018
703/1
2013/0332129 A1* 12/2013 Xia .................... G06F 17/5018
703/9

OTHER PUBLICATIONS

Kwiatkowski, Michal, Maciej Nowosielski, and Krzysztof Zaba. "Computer Simulation of Trimming Process for High Volume Press Production." (Year: 2013).*
1st USPTO Office Action for U.S. Appl. No. 15/597,937 (Parent application to the instant application) dated Apr. 12, 2017.
2nd USPTO Office Action for U.S. Appl. No. 15/597,937 (Parent application to the instant application) dated Sep. 11, 2017.
3rd USPTO Office Communication for U.S. Appl. No. 15/597,937 (Parent application to the instant application) dated Nov. 2, 2017.

* cited by examiner

102 — Receive, in a computer system, FEA model, containing a number of finite elements, representing a stamped sheet metal before being trimmed, and a definition of trimming operation setup of at least one trim steel, at least one trim post and at least one other die structure, computerized model of each trim steel contains a set of cutting-edge nodes and a corresponding trim vector for the cutting edge and the cutting direction, respectively

104 — Establish at least one trim line on the FEA model by projecting each set of cutting-edge nodes onto the FEA model in a direction defined by the corresponding trim vector, as a result, at least one of the finite elements is crossed by the at least one trim line

105 — Create a series of node-pairs along the at least one trim line at intersections with edges of the at least one crossed finite element, each node-pair including two nodes with same coordinates and, the two nodes being numerically connected to each other in all DOFs with a numerical constraint

FIG. 1A

Nodes 1,2, 3 (and similar nodes along the scrap cutter that causes initial interference) are to be released.

US 10,579,039 B2

SETTING UP PHYSICAL TOOLS FOR SCRAP TRIMMING OPERATIONS IN SHEET METAL FORMING BASED ON NUMERICAL SIMULATION RESULTS

CROSS-REFERENCE TO RELATED APPLICATIONS

This application is continuation-in-part (CIP) of a pending U.S. patent application for the same title, Ser. No. 14/597,937, filed on Jan. 15, 2015.

FIELD

The present invention generally relates to computer aided engineering analysis for simulating sheet metal forming or stamping process (e.g., deep drawing), more particularly to methods and systems for conducting a time-marching simulation of scrap trimming operations in sheet metal forming.

BACKGROUND

Sheet metal forming has been used in the industry for years for creating metal parts from a blank sheet metal, for example, automobile manufacturers and their suppliers produce many of the parts using sheet metal forming. One of the most used sheet metal forming processes is referred to as draw forming or stamping.

In general, after a blank sheet metal is formed into a drawn part (or stamped sheet metal) that includes a trimmed portion (desired-to-be-kept portion or sometimes referred to as parent portion) and at least one scrap portion (unwanted extra materials). At least one scrap portion is trimmed or cut away in a trimming operation to produce the trimmed portion, which may or may not be the finished product depending upon whether the drawn part is partially or completely drawn. It also depends upon whether the trimming operation is an intermediate one or a final one. Trimming operation is done in a trim die with scrap chute to guide the resulting scrap portions away to scrap collectors. Trimming and the resulting scrap fall are some of the top factors or considerations in affecting efficiency and productivity of a sheet metal stamping manufacturing procedure. Difficult trimming conditions, such as those multiple direct trims, a mixture of direct and cam trims, and multiple cam trims involving bypass condition, can cause trimmed scraps to get stuck and not separated from the trim edge of upper trim steels or lower trim post. Inappropriate design of die structure and scrap chute can also slow down or prevent scraps from tumbling out or falling to scrap collectors. Smaller scrap pieces (especially aluminum) can sometimes shoot straight up, and gather in areas of the die structure. All these problems result in shutdowns of stamping presses, reducing stroke-per-minute and causing hundreds of thousands of dollars in lost productivity.

With advent of computer technology, manufacturing procedure can be numerically simulated using computer aided engineering analysis (e.g., finite element analysis (FEA)). Based on the numerically-simulated results, a particular physical metal forming operation can be set up accordingly.

For example, FEA has been used for numerically simulating manufacturing process of sheet metal forming particularly including trimming operations. However, prior art approaches required many manual steps that are ad hoc, cumbersome therefore error-prone. In one of the prior art approaches, separate computerized model of each scrap portion needs to be manually created, and often required a priori expertise.

It would be desirable to have improved methods and systems for conducting a time-marching simulation of scrap trimming operations in metal forming.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Physical tools for trimming operations in forming of a sheet-metal part are set up based on numerically-simulated structural behaviors. Systems and methods of conducting a time-marching simulation of scrap trimming operations in sheet metal forming are disclosed. According to one aspect of the invention, a finite element analysis (FEA) model containing a plurality of finite elements to represent a stamped sheet metal before one or more scrap portions being cut away and a definition of a trimming operation setup are received in a computer system having an application module installed thereon. The definition includes respective computerized models for at least one trim steel, at least one trim post, at least one other die structure (scrap chute included). The computerized model for each trim steel contains a set of cutting-edge nodes along with a corresponding trim vector that define the trim steel's cutting edge and direction, respectively.

At least one trim line is established on the FEA model by projecting each set of cutting-edge nodes onto the FEA model in a direction defined by the corresponding trim vector. As a results, at least one finite element is crossed by the at least one trim line.

A series of node-pairs along the at least one trim line at intersections with edges of the at least one crossed finite element are created. Each node-pair includes two nodes with same coordinates and said two nodes are numerically-connected to each other with a numerical constraint initially.

The FEA model is modified by splitting each of the at least one crossed finite element to two or more new finite elements such that each new finite element is properly sized to preserve the original geometry and to ensure numerical stability. And each of the new finite elements is defined using one of the two nodes in a corresponding node-pair to ensure no new finite element in the modified FEA model straddles the at least one trim line. In other words, finite elements located in one side of the at least one trim line connect to finite elements in the other side of the at least one trim line only through numerical constraints.

The modified FEA model's finite elements is divided to first and second groups separated by the at least one trim line. The first group represents the trimmed portion that is modeled with rigid finite elements while the second group represents one or more scrap portions that are modeled with deformable finite elements.

A time-marching simulation of trimming operations is then conducted using the modified FEA model along with the received definition of the trimming operation setup. At each solution cycle during the time-marching simulation, the numerical constraint of one or more node-pairs is released when the one or more node-pair are determined to be reached by one of the cutting-edge nodes. Numerically-simulated structural behaviors of one or more scrap portions are obtained as the second group of finite elements deforms in response to the released numerical constraint and to contacts with at least one trim steel and at least one trim post, and with at least one other die structure.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIGS. 1A-1B collectively are a flowchart illustrating an example process of conducting a time-marching simulation of scrap trimming operations in sheet metal forming, according to an embodiment of the present invention;

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-10. However, those skilled in the art will readily appreciate that the detailed description given herein with respect to these figures is for explanatory purposes as the invention extends beyond these limited embodiments.

Figure 1B:
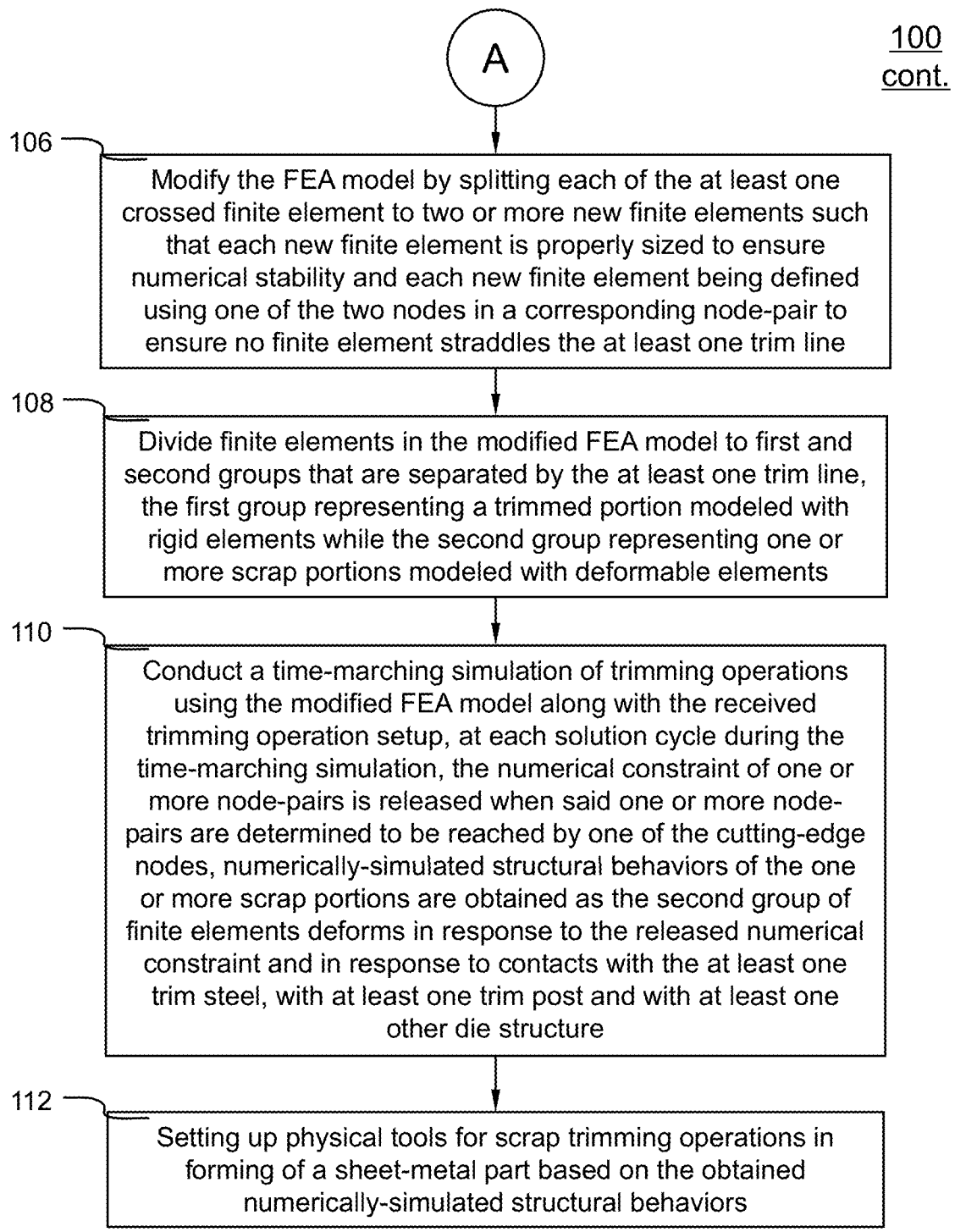

Referring first to FIGS. 1A-1B, it collectively shows a flowchart illustrating an example process 100 of conducting a time-marching simulation of scrap trimming operations in sheet metal forming according to one embodiment of the present invention.

Process 100 starts at action 102 by receiving a FEA model containing a plurality of finite elements (e.g., two-dimensional shell elements) to represent a stamped sheet metal before scrap portion or portions being trimmed off, and a definition of trimming operation setup in a computer system (e.g., computer system 100 in FIG. 10) having an application module installed thereon. The FEA model can be the resulting model of a sheet metal after numerically simulated stamping operation. The trimming operation setup includes computerized models for at least one trim steel and at least one trim post along with at least one other die structure (e.g., scrap chute). The computerized model for each of the at least one trim steel contains a set of cutting-edge nodes representing each trim steel's cutting edge and a corresponding trim vector representing each trim steel's cutting direction.

Figure 2A:
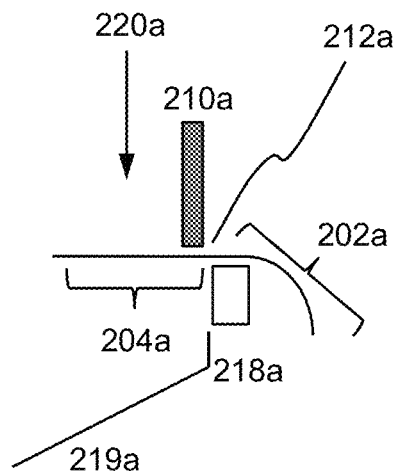
FIGS. 2A-2B are diagrams showing example trimming operation setups in accordance with one embodiment of the present invention.

FIG. 2A shows a first example trimming operation setup that includes trim steel 210a, trim post 218a (stationary) and one other die structure 219a (stationary). The trim steel 210a is used for trimming off scrap portion 204a of a stamped sheet metal along the trim steel's cutting edge 212a in a cutting direction defined by trim vector 220a. As a result of the trimming operation, trimmed portion 202a of the stamped sheet metal is remained.

Figure 2B:
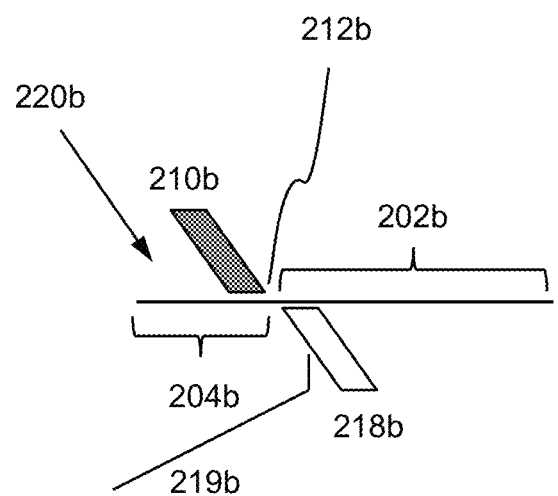

In FIG. 2B, a second example trimming operation setup is shown to include trim steel 210b, trim post 218b (stationary) and one other die structure 219b (stationary). Also shown are the trim steel's cutting edge 212b, trim vector 220b, a scrap portion 204b and a trimmed portion 202b. The difference of the second example setups is that the trim vector 220b is not perpendicular to the stamped sheet metal. The second setup is sometimes referred to as cam trim, while the first setup is referred to as direct trim.

Figure 3A:
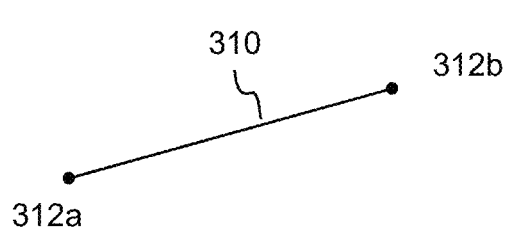
FIGS. 3A-3B are diagrams showing two example sets of cutting-edge nodes representing trim steel's cutting edge in accordance with an embodiment of the present invention.
Figure 3B:
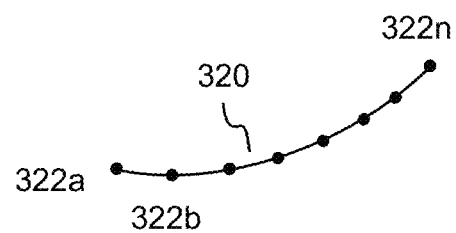

Two example sets of cutting-edge nodes are shown in FIGS. 3A-3B. A straight-line cutting edge 310 is represented by two cutting-edge nodes 312a-312b, while a curved cutting edge 320 is represented by a number of cutting-edge nodes 322a, 322b, 322n. Whereas, in the two above example setups, one trim steel, one trim post and one die structure are shown, the present invention does not set limit to the number of trim steels, trim posts and die structures. For example, there could be two trim steels with two trim posts with four die structures, or two trim steels with one trim post with eight die structures.

Figure 4:
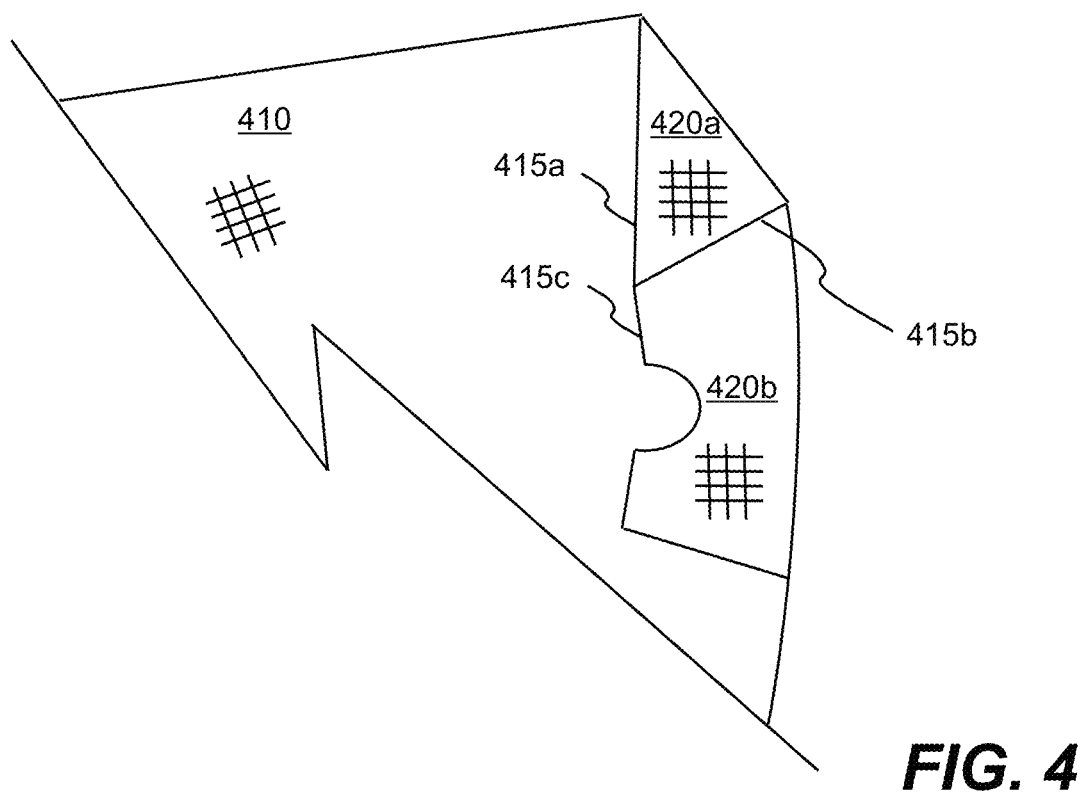
FIG. 4 is a diagram showing an example stamped sheet metal that includes a trimmed portion and scrap portions in accordance with an embodiment of the present invention.

Next, at action 104, at least one trim line are established on the FEA model with the application module by projecting each set of cutting-edge nodes (e.g., cutting-edge nodes 322a-322n) onto the FEA model in a direction defined by the corresponding trim vector (e.g., trim vector 220a). As a result, at least one finite element is crossed by the at least one trim line. FIG. 4 is a diagram showing a partial FEA model representing a stamped sheet metal that includes a trimmed portion 410 and two scrap portions 420a-420b separated by three trim lines 415a-415c. Two scrap portions 420a-420b are trimmed off along the trim lines 415a-415c in a scrap trimming operation. The trim post for trim line 415b is sometimes called "scrap cutter", which separates one large scrap piece into two smaller scrap pieces for ease of flow into the scrap collector.

Next at action 105, a series of node-pairs are created along the at least one trim line at intersections with edges of the at least one crossed finite element. Each node-pair includes two nodes having the same coordinates. The two nodes are numerically connected to each other with a numerical constraint initially.

Figure 5:
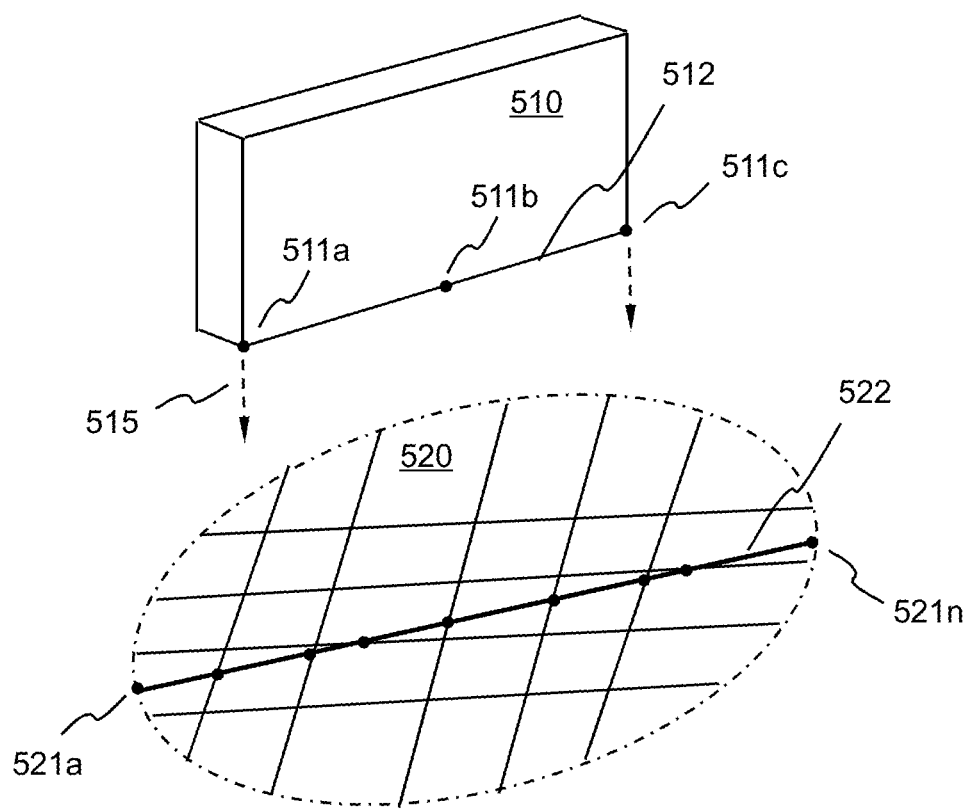
FIG. 5 is a diagram showing an example trim line being established onto a FEA model in accordance with an embodiment of the present invention.

An example scheme of establishing a trim line is shown in FIG. 5. A computerized model represents a trim steel 510 having a cutting edge 512 represented by a set of cutting-edge nodes 511a-511c, which is projected onto a FEA model 520 (shown as a partial FEA mesh) in a direction 515 (dotted line arrows) defined by a corresponding trim vector to form a trim line 522. The trim line 522 crosses a number of finite elements in the FEA model 520. A series of node-pairs 521a-521n are created along the trim line 522 at intersections with edges of those crossed finite elements.

Then, at action 106, the FEA model is modified by splitting each crossed finite element to two or more new finite elements such that each new finite element is properly sized to preserve the original geometry and to ensure numerical stability. In one example, any new finite element having its size too small comparing to others in the FEA model could cause numerical inaccuracy. In another example, new finite element may have an aspect ratio too large to cause numerical inaccuracy. Each new finite element is defined using one of the two nodes in a corresponding node-pair to ensure that no finite element in the modified FEA model straddles the at least one trim line. In other words, the only connection between two finite elements located on different side of the at least one trim line is through numerical constraints. Various example element splitting schemes shown in FIGS. 6A-6D demonstrate how a FEA model is modified according to embodiments of the present invention.

Figure 6A:
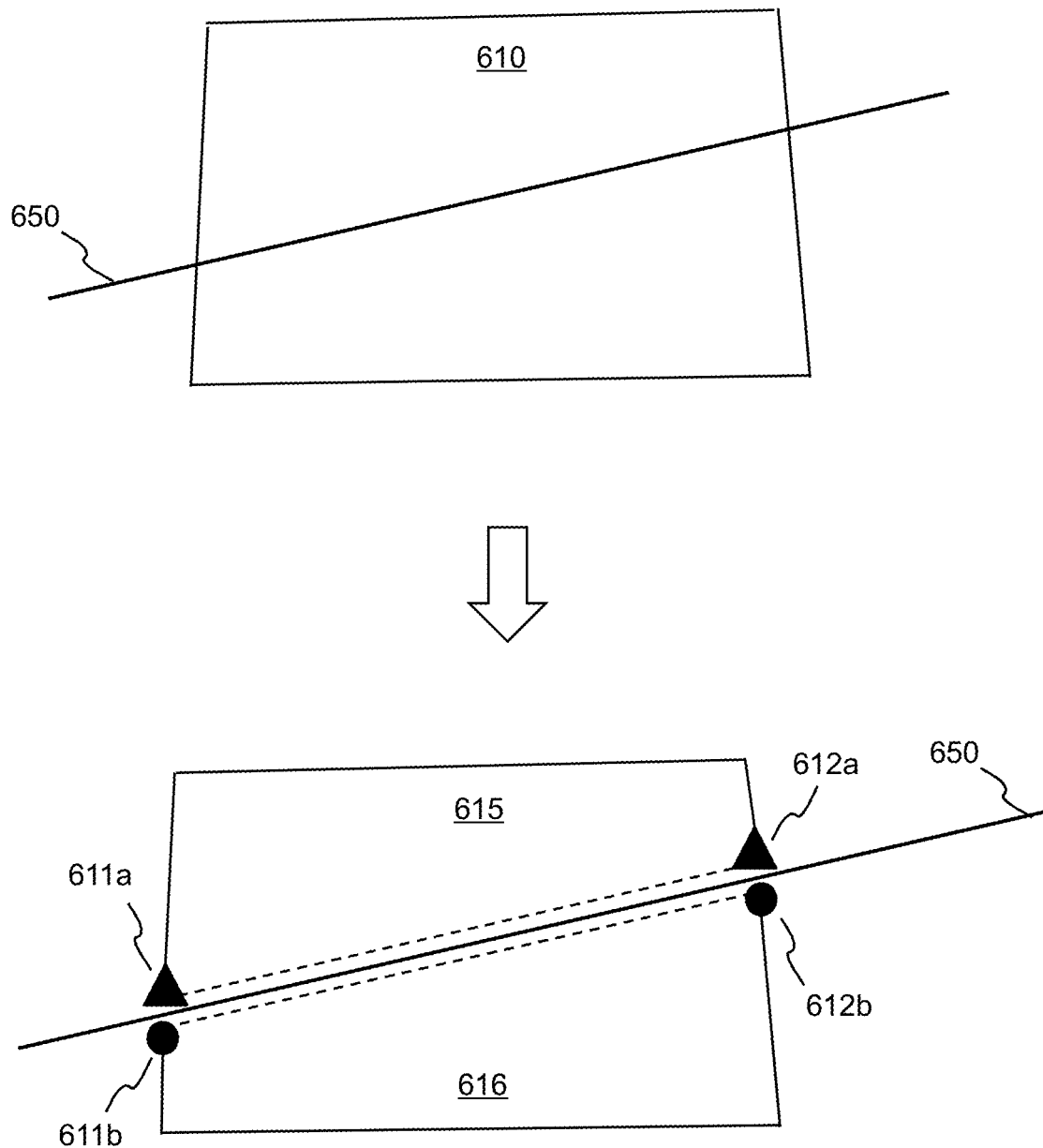
FIGS. 6A-6D are diagrams showing various example FEA model modification and node-pair creation schemes, according to an embodiment of the present invention.

In FIG. 6A, finite element 610 is crossed by trim line 650. Two node-pairs 611a-611b and 612a-612b are created. Node 611a and node 611b have the same coordinates and are numerically connected to each other with a numerical constraint (not shown here, but see, for example, numerical constraints 788a-788e in FIG. 7A). The finite element 610 is split into two new finite element 615-616. The first new finite element 615 is defined using nodes 611a and 612a, while the second new finite element 616 is defined using nodes 611b and 612b. As a result, the first new finite element 615 and the second new finite element 616 are located in either side of the trim line 650 thereby not straddling the trim line 650.

Figure 6B:
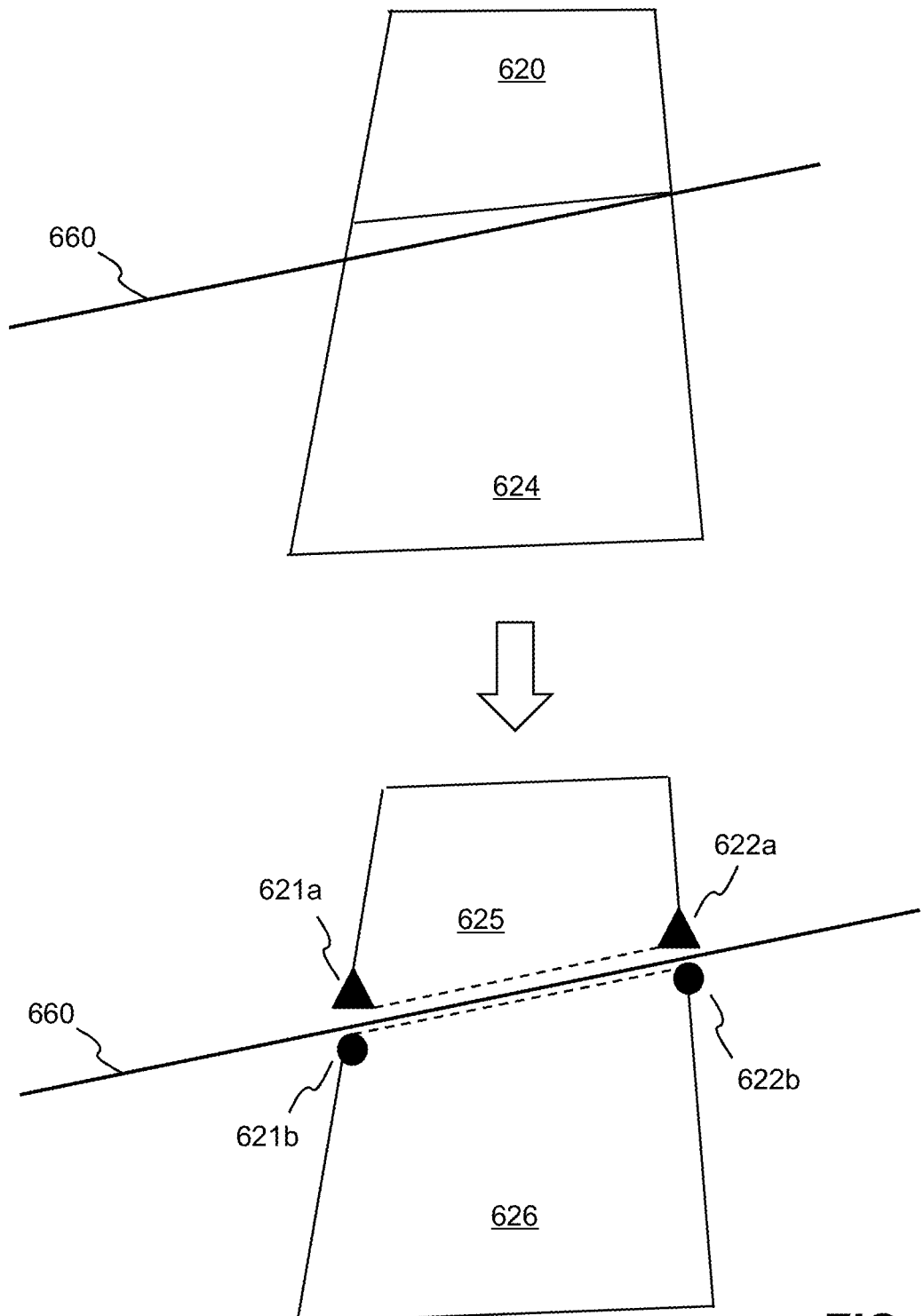

FIG. 6B shows two finite elements 620 and 624 are crossed by trim line 660. If the element splitting scheme shown in FIG. 6A were used, one of the resulting two new finite elements from splitting finite element 624 would be too small thus causing numerical problem. Instead, two new finite elements 625-626 are redefined using respective nodes in node-pairs 621a-621b and 622a-622b to ensure new finite elements 625 and 626 are located in opposite side of the trim line 660.

Figure 6C:
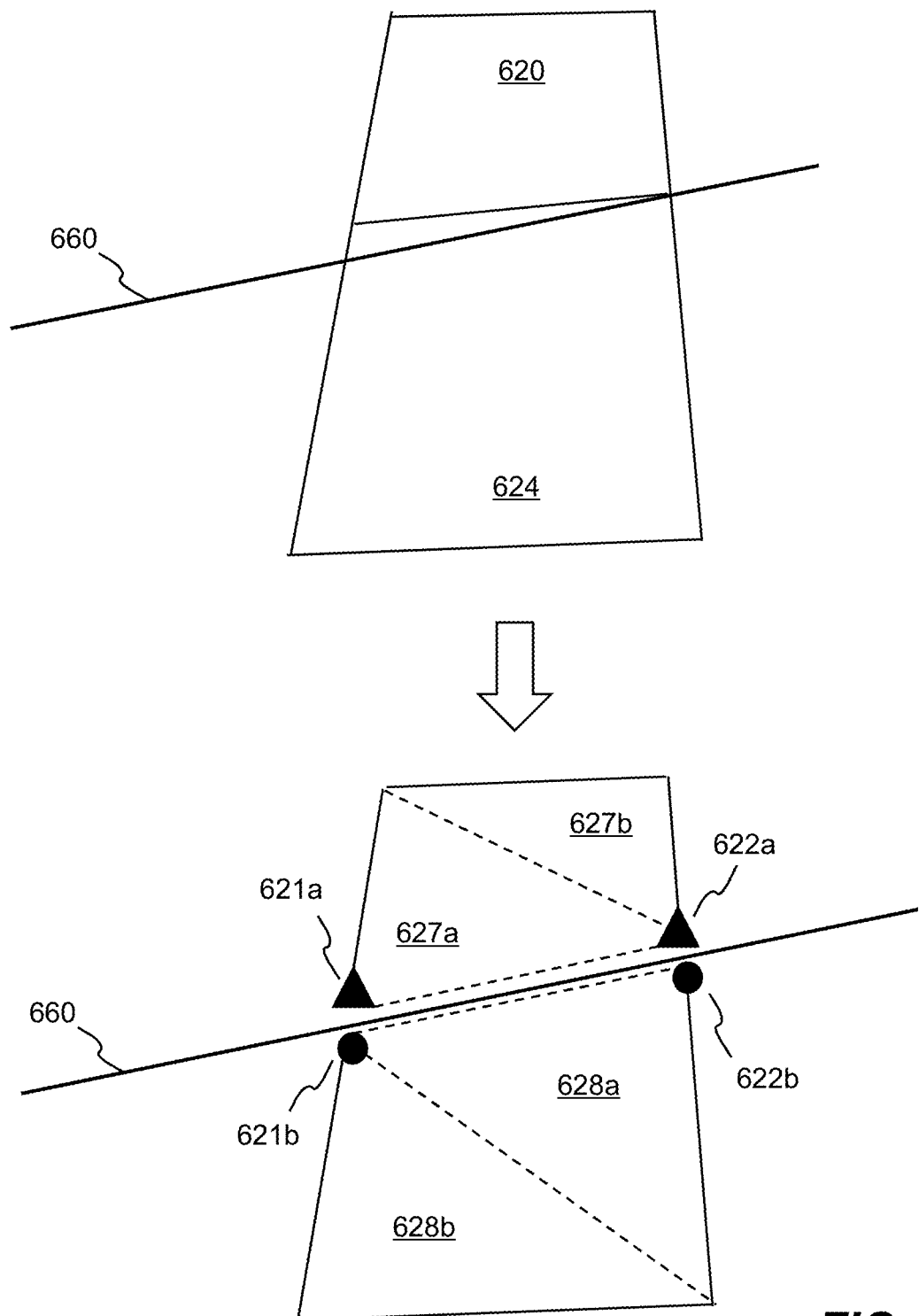

Next example element splitting scheme is shown in FIG. 6C. The same two finite elements 620 and 624 (shown in FIG. 6B) are crossed by trim line 660. However, the resulting new finite elements are different. In one side of the trim line 660, finite element 620 becomes two new finite elements 627a-627b which are defined using nodes 621a and 622a. In the other side of the trim line 660, finite element 624 is split into new finite elements 628a-628b, which are defined using nodes 621b and 622b.

Figure 6D:
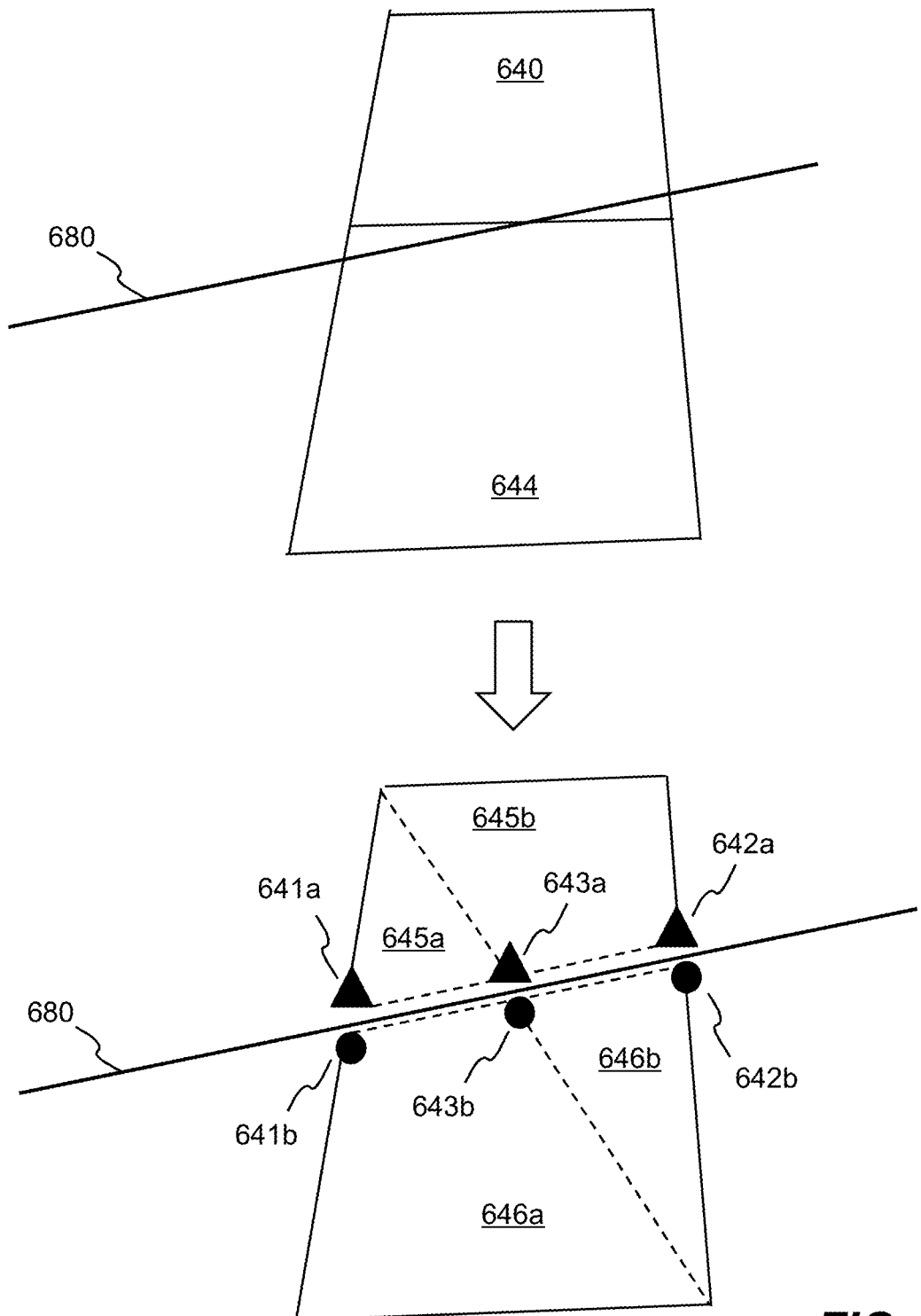

Yet another example element splitting scheme is shown in FIG. 6D. Two finite elements 640 and 644 are crossed by trim line 680. Three node-pairs 641a-641b, 642a-642b, 643a-643b are created at intersections between the edges of the finite elements 640, 644 and the trim line 680. Finite element 640 is partitioned to two new finite elements 645a and 645b, which are defined using nodes 641a, 643a and 642a in one side of the trim line 680. In the other side of the trim line 680, finite element 644 is divided to two new finite elements 646a and 646b that are defined using nodes 641b, 643b and 642b.

After the FEA model has been modified, at action 108, finite elements in the modified FEA model are divided into first and second groups separated by the at least one trim line. The first group represents the trimmed portion (i.e., the portion desired to be kept), which is modeled with rigid finite elements (i.e., finite element does not deform). The second group represents one or more scrap portions that are modeled with deformable finite elements.

At action 110, a time-marching simulation of trimming operations is conducted using the modified FEA model along with the received trimming operation setup. At each solution cycle during the time-marching simulation, the numerical constraint of one or more node-pairs is released, when one or more node-pairs are determined to be reached by one of the cutting-edge nodes (of the at least one trim steel). Numerically-simulated structural behaviors of the one or more scrap portions are obtained as the second group of finite elements deforms in response to the released numerical constraint and in response to contacts with at least one trim steel, with at least one trim post, and with at least one other die structure.

Finally, at action 112, physical tools for scrap trimming operations in forming of a sheet-metal part are set up based on the obtained numerically-simulated structural behaviors. For example, when the numerically-simulated structural behaviors of a particular metal forming operation setup indicate effective and efficient trimming operations, physical tools for such trimming operations can be set up accordingly.

FIG. 7A-7D shows a series of diagrams illustrating example releasing scheme of numerical constraint. Initially, numerical constraints 788a-788e numerically connect respective node-pairs 721a-b, 722a-b, 723a-b, 724a-b and 725a-b in all degrees of freedoms (DOFs). For visual purpose, a gap is shown (which should not exist because the nodal coordinates of the two nodes in a node-pair are the same).

Figure 7A:
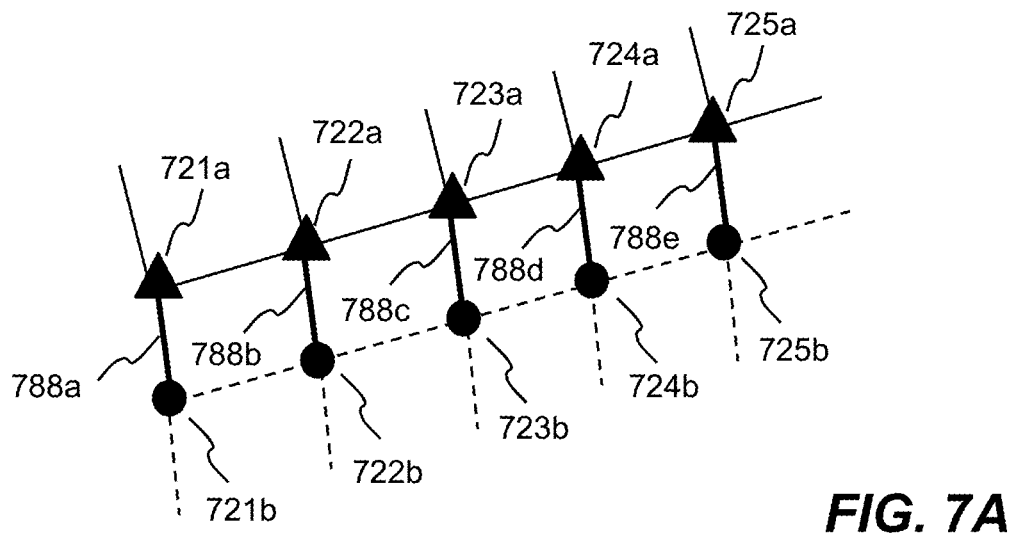
FIGS. 7A-7D are a series of diagrams showing an example numerical constraint releasing scheme, according to an embodiment of the present invention.
Figure 7B:
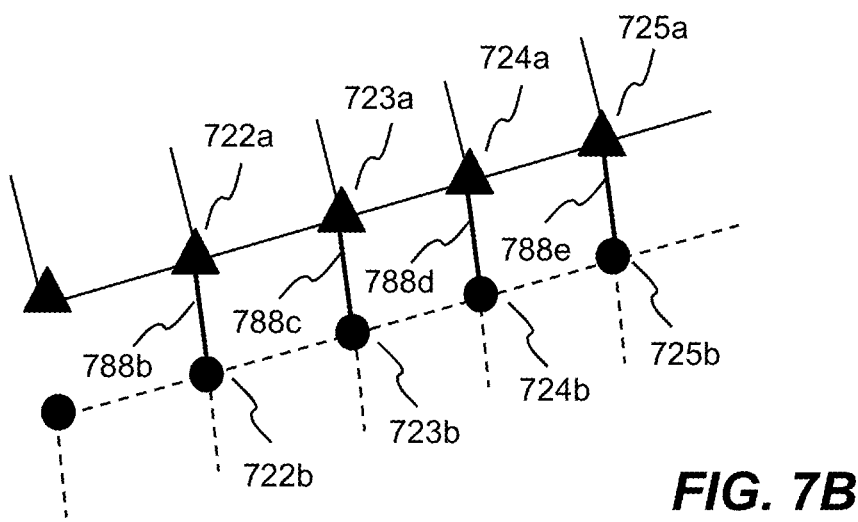
Figure 7C:
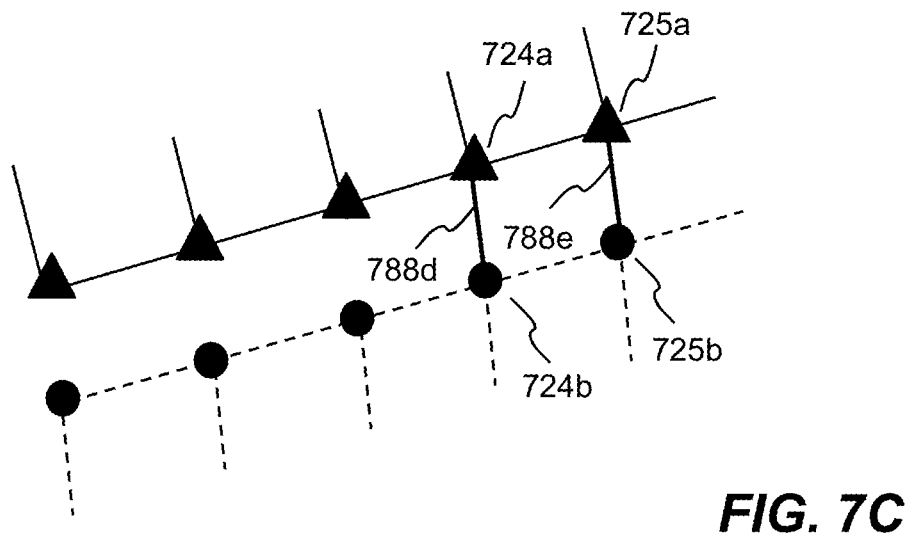
Figure 7D:
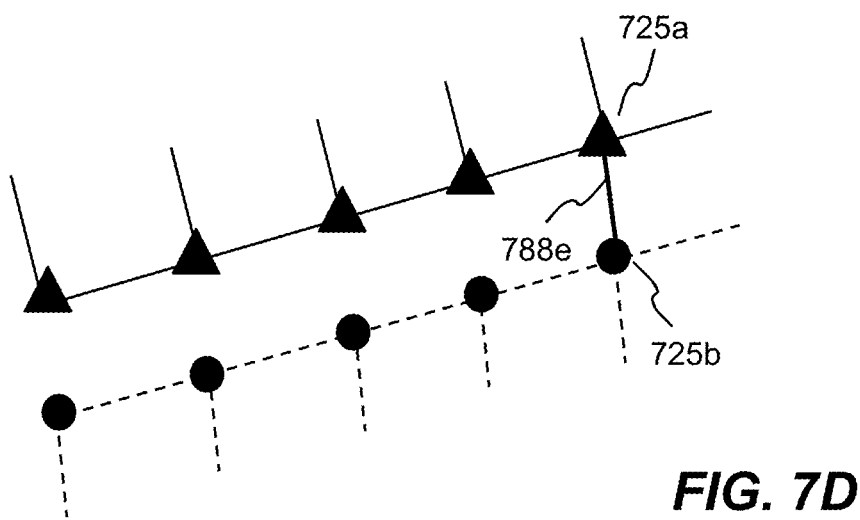

As the time-marching simulation moves on, numerical constraint 788a has been released in FIG. 7B. Two more constraints 788b and 788c are released in FIG. 7C. Shown in FIG. 7D, one more numerical constraint 788d is released. When each numerical constraint is released, it numerically simulates one or more scrap portion being cut away. Releasing sequence of the numerical constraints can be in any order, dependent on the contact with the cutting edge nodes of the at least one trim steel.

Figure 8:
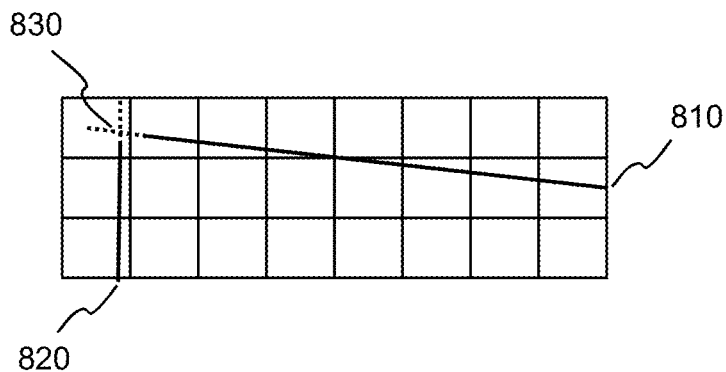
FIG. 8 is a diagram showing two example trim lines crossing each other in accordance with one embodiment of the present invention.

FIG. 8 shows trim line 810 and trim line 820 at intended intersection 830. To ensure two trim lines would numerically intersect each other, each trim line created is extended by an additional length (dashed lines), either by a default value or by a user specified input value. In addition, a tolerance is added for detecting contacts between a cutting-edge node and a node-pair to overcome numerical inaccuracies inherited in FEA model.

Figure 9:
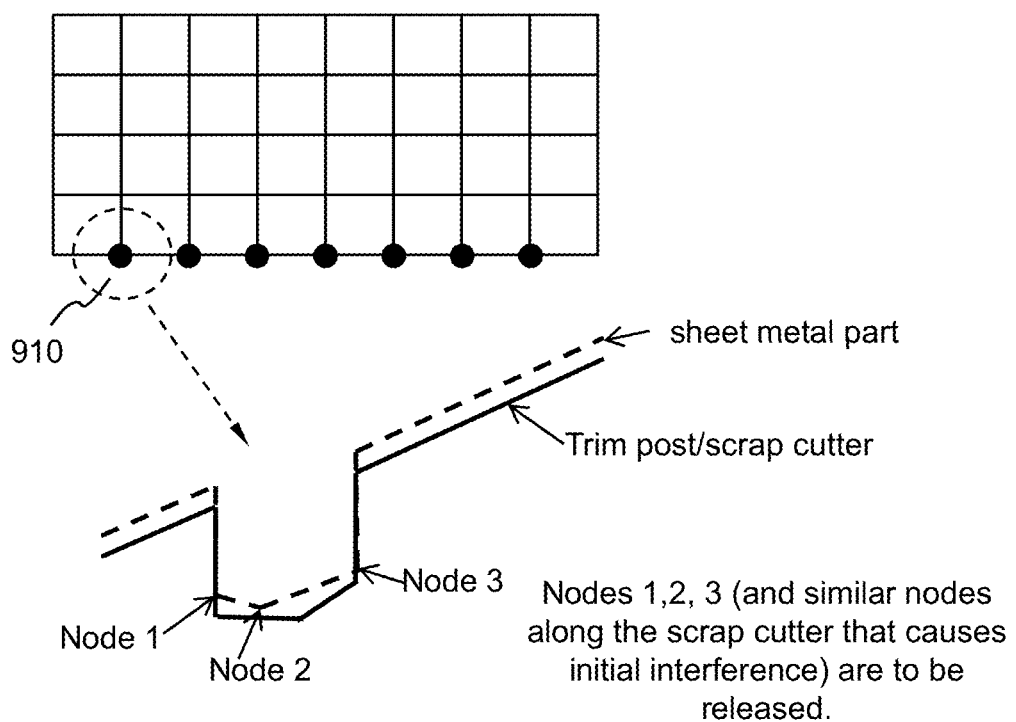
FIG. 9 is a diagram showing an example simplified draw bead model in accordance with one embodiment of the present invention.

FIG. 9 shows an example of crude modeling technique used for draw beads 910 (i.e., locations for holding or clamping down the sheet metal). If the scrap nodes are located less than the distance of the one-half of the sheet metal thickness to the scrap cutter or trim post, initial interference would occur between the scrap and the scrap cutter or trim post, causing numerical instability. These nodes can be ignored and released from the cutting edge nodes of the at least one trim steel. This can be done with a user-defined option to indicate which nodes need to be excluded or released.

Figure 10:
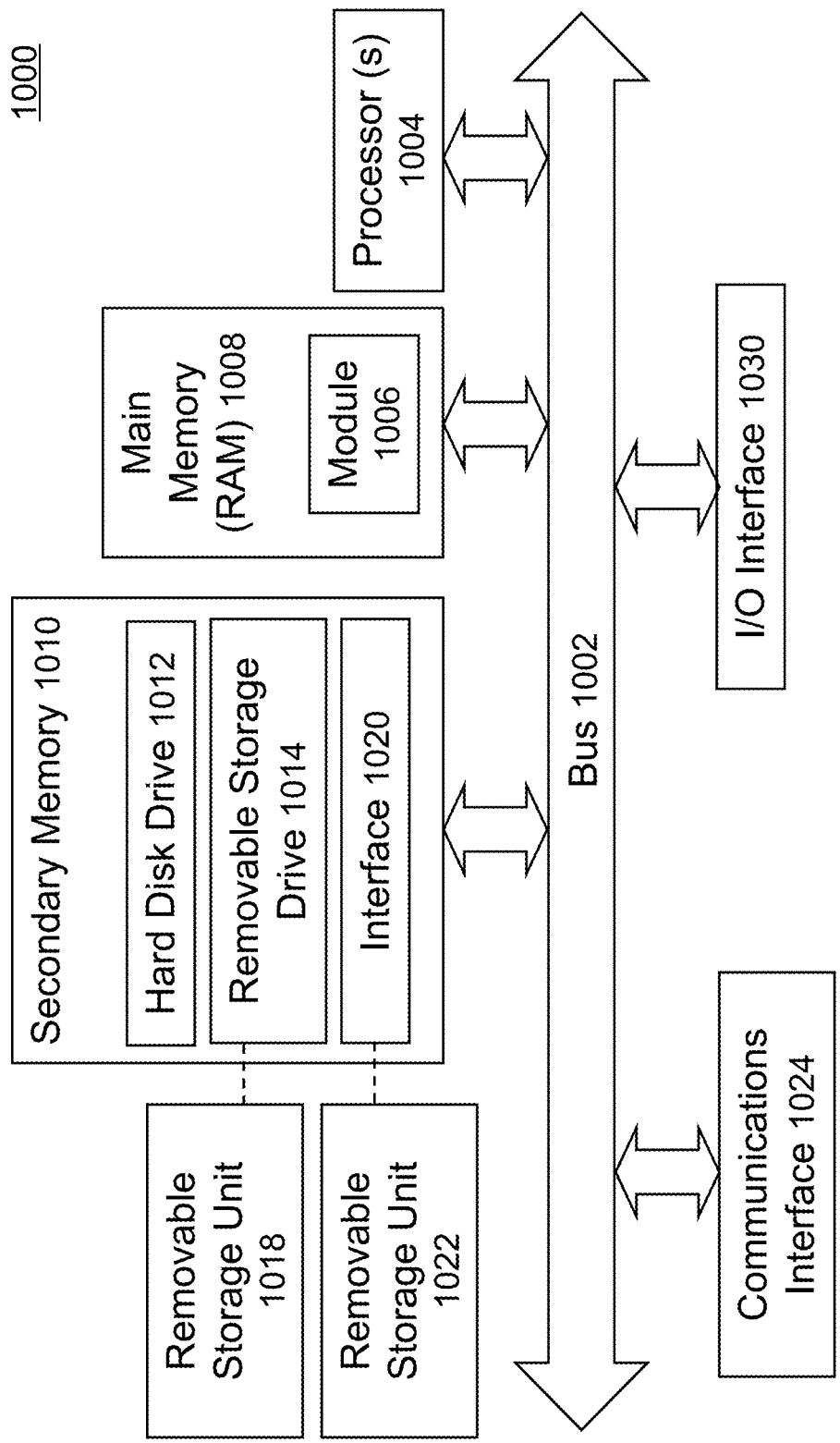
FIG. 10 is a function block diagram showing salient components of an exemplary computer, in which one embodiment of the present invention may be implemented.

According to one aspect, the present invention is directed towards one or more computer systems capable of carrying out the functionality described herein. An example of a computer system 1000 is shown in FIG. 10. The computer system 1000 includes one or more processors, such as processor 1004. The processor 1004 is connected to a computer system internal communication bus 1002. Various software embodiments are described in terms of this exemplary computer system. After reading this description, it will become apparent to a person skilled in the relevant art(s) how to implement the invention using other computer systems and/or computer architectures.

Computer system 1000 also includes a main memory 1008, preferably random access memory (RAM), and may also include a secondary memory 1010. The secondary memory 1010 may include, for example, one or more hard disk drives 1012 and/or one or more removable storage drives 1014, representing a floppy disk drive, a magnetic tape drive, an optical disk drive, etc. The removable storage drive 1014 reads from and/or writes to a removable storage unit 1018 in a well-known manner. Removable storage unit 1018, represents a floppy disk, magnetic tape, optical disk, etc. which is read by and written to by removable storage drive 1014. As will be appreciated, the removable storage unit 1018 includes a computer readable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 1022 and interfaces 1020 which allow software and data to be transferred from the removable storage unit 1022 to computer system 1000. In general, Computer system 1000 is controlled and coordinated by operating system (OS) software, which performs tasks such as process scheduling, memory management, networking and I/O services.

There may also be a communications interface 1024 connecting to the bus 1002. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024. The computer 1000 communicates with other computing devices over a data network based on a special set of rules (i.e., a protocol). One of the common protocols is TCP/IP (Transmission Control Protocol/Internet Protocol) commonly used in the Internet. In general, the communication interface 1024 manages the assembling of a data file into smaller packets that are transmitted over the data network or reassembles received packets into the original data file. In addition, the communication interface 1024 handles the address part of each packet so that it gets to the right destination or intercepts packets destined for the computer 1000. In this document, the terms "computer program medium", "computer readable medium", "computer recordable medium" and "computer usable medium" are used to generally refer to media such as removable storage drive 1014 (e.g., flash storage drive), and/or a hard disk installed in hard disk drive 1012. These computer program products are means for providing software to computer system 1000. The invention is directed to such computer program products.

The computer system 1000 may also include an input/output (I/O) interface 1030, which provides the computer system 1000 to access monitor, keyboard, mouse, printer, scanner, plotter, and the likes.

Computer programs (also called computer control logic) are stored as application modules 1006 in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012, or communications interface 1024. The application module 1006, when executed by the processor 1004, causes the processor 1004 to perform the functions of the invention as described herein.

The main memory 1008 may be loaded with one or more application modules 1006 that can be executed by one or more processors 1004 with or without a user input through the I/O interface 1030 to achieve desired tasks. In operation, when at least one processor 1004 executes one of the application modules 1006, the results are computed and stored in the secondary memory 1010 (i.e., hard disk drive 1012). Results of the analysis (e.g., Separation along the lancing route in progressive lancing operation) are reported to the user via the I/O interface 1030 either in a text or in a graphical representation upon user's instructions.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method of setting up physical tools for scrap trimming operations in forming of a sheet-metal part based on numerical simulation, the method comprising:

receiving, in a computer system having an application module installed thereon, a finite element analysis (FEA) model containing a plurality of finite elements to represent a stamped sheet metal before one or more scrap portions being cut away and a definition of a trimming operation setup that includes respective computerized models for at least one trim steel, at least one trim post and at least one other die structure, the computerized model for each trim steel containing a set of cutting-edge nodes representing said trim steel's cutting edge and a corresponding trim vector defining said each trim steel's cutting direction;

establishing, with the application module, at least one trim line on the FEA model by projecting each set of cutting-edge nodes onto the FEA model in accordance with the corresponding trim vector, at least one finite element being crossed by the at least one trim line as a result;

creating, with the application module, a series of node-pairs along the at least one trim line at intersections with edges of the at least one crossed finite element, each node-pair including two nodes with same coordinates and said two nodes being connected in all degrees of freedoms (DOFs) with a numerical constraint;

modifying, with the application module, the FEA model by splitting said at least one crossed finite element into two or more new finite elements such that each new finite element is properly sized to ensure numerical stability and said each new finite element being defined using one of the two nodes in a corresponding node-pair to ensure no finite element straddles the at least one trim line;

dividing, with the application module, the modified FEA model's finite elements into first and second groups separated by said at least one trim line, the first group representing a trimmed portion modeled with rigid finite elements while the second group representing said one or more scrap portions modeled with deformable finite elements;

conducting, with the application module, a time-marching simulation of trimming operations using the modified FEA model along with the received definition of the trimming operation setup, at each solution cycle during the time-marching simulation, the numerical constraint of one or more of the node-pairs that are determined to be reached by one of the cutting-edge nodes is released, and numerically-simulated structural behaviors of said one or more scrap portions are obtained as said second group of finite elements deforms in response to the released numerical constraint, and in response to contacts with said at least one trim steel, with said at least one trim post and with said at least one other die structure.

2. The method of claim 1, wherein the plurality of finite elements comprises two or more two-dimensional shell elements.

3. The method of claim 1, further comprises ensuring, with the application module, a first trim line and a second trim line numerically intersect each other by extending respective ends of the first trim line and the second trim line by a default value or by a user specified input value.

4. The method of claim 1, said dividing the modified FEA model's finite elements into first and second groups is achieved by using a user-defined reference node located in each of the one or more scrap portions.

5. The method of claim 1, said being determined to be reached by said one of the cutting edge nodes further comprises adding a numerical tolerance between said one or more node-pairs and said one of the cutting edge nodes, the tolerance being used for overcoming numerical inaccuracies inherited in the FEA model.

6. The method of claim 5, said numerical inaccuracies include initial penetrations between the FEA model and the trim post.

7. The method of claim 5, said numerical inaccuracies include a simplified numerical representation of physical draw beads.

8. A system for setting up physical tools for scrap trimming operations in forming of a sheet-metal part based on numerical simulation, the system comprises:
an input/output (I/O) interface;
a memory for storing computer readable code for an application module;
at least one processor coupled to the memory, said at least one processor executing the computer readable code in the memory to cause the application module to perform operations of:
receiving a finite element analysis (FEA) model containing a plurality of finite elements to represent a stamped sheet metal before one or more scrap portions being cut away and a definition of a trimming operation setup that includes respective computerized models for at least one trim steel, at least one trim post and at least one other die structure, the computerized model for each trim steel containing a set of cutting-edge nodes representing said trim steel's cutting edge and a corresponding trim vector defining said each trim steel's cutting direction;
establishing at least one trim line on the FEA model by projecting each set of cutting-edge nodes onto the FEA model in accordance with the corresponding trim vector, at least one finite element being crossed by the at least one trim line as a result;
creating a series of node-pairs along the at least one trim line at intersections with edges of the at least one crossed finite element, each node-pair including two nodes with same coordinates and said two nodes being connected in all degrees of freedoms (DOFs) with a numerical constraint;
modifying the FEA model by splitting said at least one crossed finite element into two or more new finite elements such that each new finite element is properly sized to ensure numerical stability and said each new finite element being defined using one of the two nodes in a corresponding node-pair to ensure no finite element straddles the at least one trim line;
dividing the modified FEA model's finite elements into first and second groups separated by said at least one trim line, the first group representing a trimmed portion modeled with rigid finite elements while the second group representing said one or more scrap portions modeled with deformable finite elements; and
conducting a time-marching simulation of trimming operations using the modified FEA model along with the received definition of the trimming operation setup, at each solution cycle during the time-marching simulation, the numerical constraint of one or more of the node-pairs that are determined to be reached by one of the cutting-edge nodes is released, and numerically-simulated structural behaviors of said one or more scrap portions are obtained as said second group of finite elements deforms in response to the released numerical constraint, and in response to contacts with said at least one trim steel, with said at least one trim post and with said at least one other die structure.

9. The system of claim 8, wherein the plurality of finite elements comprises two or more two-dimensional shell elements.

10. The system of claim 8, ensuring a first trim line and a second trim line numerically intersect each other by extending respective ends of the first trim line and the second trim line by a default value or by a user specified input value.

11. The system of claim 8, said dividing the modified FEA model's finite elements into first and second groups is achieved by using a user-defined reference node located in each of the one or more scrap portions.

12. The system of claim 8, said being determined to be reached by said one of the cutting edge nodes further comprises adding a numerical tolerance between said one or more node-pairs and said one of the cutting edge nodes, the tolerance being used for overcoming numerical inaccuracies inherited in the FEA model.

13. The system of claim 12, said numerical inaccuracies include initial penetrations between the FEA model and the trim post.

14. The system of claim 12, said numerical inaccuracies include a simplified numerical representation of physical draw beads.

15. A non-transitory computer readable storage medium containing computer executable instructions for conducting a time-marching simulation of scrap trimming operations in sheet metal forming by operations comprising:
   receiving, in a computer system having an application module installed thereon, a finite element analysis (FEA) model containing a plurality of finite elements to represent a stamped sheet metal before one or more scrap portions being cut away and a definition of a trimming operation setup that includes respective computerized models for at least one trim steel, at least one trim post and at least one other die structure, the computerized model for each trim steel containing a set of cutting-edge nodes representing said trim steel's cutting edge and a corresponding trim vector defining said each trim steel's cutting direction;
   establishing, with the application module, at least one trim line on the FEA model by projecting each set of cutting-edge nodes onto the FEA model in accordance with the corresponding trim vector, at least one finite element being crossed by the at least one trim line as a result;
   creating, with the application module, a series of node-pairs along the at least one trim line at intersections with edges of the at least one crossed finite element, each node-pair including two nodes with same coordinates and said two nodes being connected in all degrees of freedoms (DOFs) with a numerical constraint;
   modifying, with the application module, the FEA model by splitting said at least one crossed finite element into two or more new finite elements such that each new finite element is properly sized to ensure numerical stability and said each new finite element being defined using one of the two nodes in a corresponding node-pair to ensure no finite element straddles the at least one trim line;
   dividing, with the application module, the modified FEA model's finite elements into first and second groups separated by said at least one trim line, the first group representing a trimmed portion modeled with rigid finite elements while the second group representing said one or more scrap portions modeled with deformable finite elements; and
   conducting, with the application module, a time-marching simulation of trimming operations using the modified FEA model along with the received definition of the trimming operation setup, at each solution cycle during the time-marching simulation, the numerical constraint of one or more of the node-pairs that are determined to be reached by one of the cutting-edge nodes is released, and numerically-simulated structural behaviors of said one or more scrap portions are obtained as said second group of finite elements deforms in response to the released numerical constraint, and in response to contacts with said at least one trim steel, with said at least one trim post and with said at least one other die structure.

16. The non-transitory computer readable storage medium of claim 15, wherein the plurality of finite elements comprises two or more two-dimensional shell elements.

17. The non-transitory computer readable storage medium of claim 15, further comprises ensuring, with the application module, a first trim line and a second trim line numerically intersect each other by extending respective ends of the first trim line and the second trim line by a default value or by a user specified input value.

18. The non-transitory computer readable storage medium of claim 15, said dividing the modified FEA model's finite elements into first and second groups is achieved by using a user-defined reference node located in each of the one or more scrap portions.

19. The non-transitory computer readable storage medium of claim 15, said being determined to be reached by said one of the cutting edge nodes further comprises adding a numerical tolerance between said one or more node-pairs and said one of the cutting edge nodes, the tolerance being used for overcoming numerical inaccuracies inherited in the FEA model.

20. The non-transitory computer readable storage medium of claim 19, said numerical inaccuracies include initial penetrations between the FEA model and the trim post, and a simplified numerical representation of physical draw beads.

* * * * *